United States Patent [19]

Wheatley et al.

[11] Patent Number: 5,262,894
[45] Date of Patent: Nov. 16, 1993

[54] MULTICOMPONENT, MULTILAYER POLYMERIC REFLECTIVE BODIES

[75] Inventors: John A. Wheatley; Walter J. Schrenk, both of Midland, Mich.

[73] Assignee: The Dow Chemical Company, Midland, Mich.

[21] Appl. No.: 833,272

[22] Filed: Feb. 10, 1992

Related U.S. Application Data

[63] Continuation-in-part of Ser. No. 466,168, Jan. 17, 1990, Pat. No. 5,122,906, and a continuation-in-part of Ser. No. 463,645, Jan. 11, 1990, Pat. No. 5,122,905, each is a continuation-in-part of Ser. No. 368,695, Jun. 20, 1989, abandoned.

[51] Int. Cl.$^5$ ............................ G02B 5/08; G02B 5/28
[52] U.S. Cl. ................................. 359/586; 359/589; 359/883
[58] Field of Search .................. 359/580–588, 359/883, 884, 554–556, 359, 491; 428/212, 213, 131, 156; 215/246; 206/807; 528/204

[56] References Cited

U.S. PATENT DOCUMENTS

| | | | |
|---|---|---|---|
| 3,560,076 | 2/1971 | Ceppi | 359/491 |
| 4,187,336 | 2/1980 | Gordon | 359/580 |
| 4,793,669 | 12/1988 | Penilloux | 359/581 |
| 4,937,134 | 6/1990 | Schrenk et al. | 359/580 |
| 5,091,244 | 2/1992 | Biornard | 359/586 |
| 5,149,578 | 9/1992 | Wheatley et al. | 428/213 |
| 5,168,003 | 12/1992 | Proscia | 359/586 |

FOREIGN PATENT DOCUMENTS

| | | | |
|---|---|---|---|
| 2-44842 | 9/1989 | Japan | 359/580 |
| 2015812 | 9/1979 | United Kingdom . | |
| 2066155 | 7/1981 | United Kingdom . | |

Primary Examiner—Bruce Y. Arnold
Assistant Examiner—Thong Nguyen

[57] ABSTRACT

A multicomponent, multilayered, highly reflective polymeric body which is thermoformable and capable of being fabricated into films, sheets and a variety of parts while maintaining a uniform reflective appearance is provided. The reflective polymeric body includes at least first, second, and third diverse polymeric materials having a sufficient number of alternating layers of the polymeric materials such that a portion of the light incident on the body is reflected. A sufficient number of the individual layers of the body have optical thicknesses of not more than 0.09 micrometers or not less than 0.45 micrometers, such that there is an absence of visibly perceived color in the body. The polymeric materials having the highest and lowest refractive indices differ from each other in refractive index by at least about 0.03. The reflective body may be fabricated into mirrors, noncorroding metallic appearing articles and parts, reflectors, reflective lenses, and the like.

24 Claims, 4 Drawing Sheets

MULTICOMPONENT, MULTILAYER POLYMERIC REFLECTIVE BODIES

CROSS-REFERENCE TO RELATED APPLICATION

This application is a continuation-in-part of commonly assigned U.S. application Ser. No. 07/466,168, filed Jan. 17, 1990 and entitled THICK/VERY THIN MULTILAYER REFLECTIVE BODY, now U.S. Pat. No. 5,122,906 to Wheatley, and is also a continuation-in-part of commonly assigned U.S. application Ser. No. 07/463,645, filed Jan. 11, 1990 and entitled REFLECTIVE POLYMERIC BODY, now U.S. Pat. No. 5,122,905 to Wheatley et. al., which applications are themselves continuations-in-part of U.S. application Ser. No. 07/368,695, filed Jun. 20, 1989, now abandoned. This application is also related to commonly-assigned U.S. application Ser. No. 07/629,520, filed Dec. 18, 1990 and entitled POLYMERIC REFLECTIVE BODIES WITH MULTIPLE LAYER TYPES, now U.S. Pat. No. 5,126,880 to Wheatley et. al.

BACKGROUND OF THE INVENTION

The present invention relates to a multicomponent, multilayered polymeric body comprising at least three diverse polymeric materials, which reflects light and which can be fabricated to have a silvery or hued (i.e., copper, gold, etc.) metallic or nonconventional hued (i.e., blue, green, etc.) appearance, and to articles produced therefrom which may find use as mirrors, reflectors, refractors, lenses, polarizers, and the like.

Conventional methods for fabricating reflective surfaces include forming such surfaces of highly polished metals. Because of the high costs and fabricating problems involved in using metals, more recently fabricators have used plastic surfaces which contain thin coatings of metal thereon. Thus, metal coated plastic articles are now commonly found as both decorative and functional items in a number of industries. Such articles are used as bright work for consumer appliances such as refrigerators, dishwashers, washers, dryers, radios, and the like. These types of articles are also used by the automotive industry as head lamp reflectors, bezels, radio knobs, automotive trim, and the like. These articles may also find use in commercial and industrial lighting applications.

Typically, such metal coated plastic articles are formed by electroplating or by the vacuum, vapor, or chemical deposition of a thin metal layer on the surface of the article. Additionally, such coatings are subject to the chipping and flaking of the metal coatings as well as corrosion of the metal over time. If additional protective layers must be applied over the metal coating to protect it, additional labor and materials costs are involved. Further, there may be environmental disposal problems with some metal deposition processes.

Multilayer articles of polymers are known, as are methods and apparatuses for making such articles. For example, such multilayered articles may be prepared utilizing multilayer coextrusion devices as described in commonly-assigned U.S. Pat. Nos. 3,773,882 and 3,884,606 to Schrenk. Such devices are capable of simultaneously extruding diverse thermoplastic polymeric materials in substantially uniform or varying layer thicknesses. The number of layers may be multiplied by the use of a device as described in commonly-assigned U.S. Pat. No. 3,759,647 to Schrenk et. al.

Im et. al., U.S. Pat. No. 4,540,623, teach a multilayer laminated article which includes a polycarbonate as one of the alternating layers. The articles of Im et. al., however, are intended to be transparent rather than reflective and to exhibit optical properties comparable to a pure polycarbonate polymer.

Alfrey, Jr. et. al., U.S. Pat. No. 3,711,176, teach a multilayered highly reflective thermoplastic body fabricated using thin film techniques. That is, the reflective optically thin film layers of Alfrey, Jr. et. al. rely on the constructive interference of light to produce reflected visible, ultraviolet, or infrared portions of the electromagnetic spectrum. Such reflective optically thin films have found use in decorative items because of the iridescent reflective qualities of the film.

However, the films of Alfrey, Jr. et. al. are extremely sensitive to thickness changes, and it is characteristic of such films to exhibit streaks and spots of nonuniform color. Further, color reflected by such films is dependent on the angle of incidence of light impinging on the film. Thus, such films are not practical for uses which require uniformity of reflectivity. Moreover, such films are not practical to thermoform into articles as localized thinning of the layers during thermoforming causes alterations in the reflective characteristics of the films.

Accordingly, there remains a need in the art for a highly reflective polymeric sheet or body which can be fabricated into a variety of parts without alteration of the uniform reflective appearance of the material over a range of processing conditions and part geometry. Further, there is a need for a highly reflective polymeric sheet or body which can be post formed without alteration of the uniform reflective appearance of the material. Still further, there is a need for silvery or metallic appearing articles which do not use metal.

SUMMARY OF THE INVENTION

The present invention meets those needs by providing a multicomponent, multilayered polymeric reflective body comprising at least three optically dissimilar components which is highly reflective, post formable, and capable of being fabricated into a variety of parts while maintaining a uniform reflective appearance. The body comprises alternating layers which differ in refractive index and which are of an optical thickness such that essentially no visibly perceived iridescence is reflected. In one embodiment of the invention, a substantial majority of either optically thick, or a combination of optically thick and very thin layers are utilized. In another embodiment of the invention, optically thin layers may be introduced into the reflective body without introducing visibly perceived iridescence. While the alternating layers must differ in refractive index, the layers can be positioned in many arrangements. That is, while a preferred embodiment of the invention utilizes alternating layers of a combination of optically thick and optically very thin layers, the arrangement of layers may be varied as desired. The optically thick layers are too thick to cause visible iridescent effects (visually perceived as a variety of colors), while the very thin layers are too thin to cause such effects. The presence and location of optically thin layers may be controlled to prevent visible iridescent effects. The resulting multilayered polymeric body reflects substantially white light and exhibits a silvery, metallic appearance.

The terms "reflective", "reflectivity", "reflection", and "reflectance" as used herein refer to total reflectance (i.e., ratio of reflected wave energy to incident wave energy) sufficiently specular in nature such that the polymeric body has a metallic appearance. The use of these terms is intended to encompass semi-specular or diffuse reflection such as that of brushed metal, pewter, and the like. In general, reflectance measurement refers to reflectance of light rays into an emergent cone with a vertex angle of 15 degrees centered around the specular angle.

A specific intensity of reflectance, when used herein, is the intensity of reflection which occurs at a wavelength where negligible absorption occurs. For example, a silver appearing article reflects substantially all visible wavelengths (white light), whereas the introduction of a dye to achieve other metallic hues will necessarily lower reflectivity of the body at the absorbing wavelengths. Wavelengths unaffected by the dye will be reflected at essentially the same intensity as a non-dyed sample, and it is at these unaffected wavelengths to which the intensity of reflectance is referring.

According to one aspect of the present invention, a reflective polymeric body of at least three diverse polymeric materials is provided, the body comprising a sufficient number of alternating layers of the polymeric materials such that at least a portion of the light incident on the body is reflected. Preferably, at least 30% of the light incident on the body is reflected. As used herein, the term "light" is meant to encompass not only visible light but also electromagnetic radiation in both the infrared and ultraviolet regions of the spectrum. The reflected portion of the light refers, as discussed above, to reflected light at wavelengths where negligible absorption occurs. By the term "diverse" we mean that the polymeric materials need not differ in any respect except in terms of refractive index. Thus, while adjacent layers may be chemically diverse, if such materials have the same refractive index, then for purposes of the present invention they are not "diverse". By the term "alternating" we mean that two diverse polymeric materials are present at each layer interface to create a refractive index mismatch. The term "alternating" is not intended to be limited to any specific repeating unit or order of polymeric materials in the body.

The intensity of the reflected light is governed by the general equation which is applicable to multicomponent bodies:

$$R_k = \frac{(R_{k-1} + r_k - 2R_{k-1}r_k)}{(1 - R_{k-1}r_k)} \times 100$$

where $R_k$ is the amount of reflected light (%) for a stack of k layers having as many as k different refractive indices, $R_{k-1}$ is the amount of reflected light from the k−1 layers, and $$r_k = \left(\frac{N_h - N_l}{N_h + N_l}\right)^2$$

where $r_k$ is the amount of light reflected at the $k^{th}$ layer interface, and where $N_h$ is the refractive index of the polymeric material having the higher refractive index at the $k^{th}$ layer interface and $N_l$ is the refractive index of the polymeric material having the higher refractive index at the polymeric material having the lower refractive index at the $k^{th}$ layer interface.

The individual layers should have optical thicknesses such that essentially no visibly perceived iridescence is reflected from the body. In one embodiment of the invention, this is accomplished where a substantial majority of the individual layers of the body have an optical thickness of not more than 0.09 micrometers (i.e., optically very thin layers) or not less than 0.45 micrometers (i.e. optically thick layers), with at least one of the individual layers having an optical thickness of not more than 0.09 micrometers. In an alternative embodiment of the invention, a substantial majority of the individual layers of the body have an optical thickness of at least 0.45 micrometers (i.e., optically thick layers).

The diverse polymeric materials differ from each other in refractive index. Further, the polymers having the highest and lowest refractive indices differ from each other by at least about 0.03. Other polymers forming the layers may have refractive indices intermediate the high and low refractive index polymers.

A number of substantially transparent polymers are suitable for use in the present invention. In a preferred embodiment of the invention utilizing three diverse polymeric materials, the first polymeric material is polystyrene, the second polymeric material is a copolymer of styrene and methacrylic acid, and the third polymeric material is polymethyl methacrylate. The polymeric body may also comprise three or more components of different repeating units. In one embodiment using a three component pattern of repeating units ABCB, the first (A) polymeric material is thiodiphenyl copolycarbonate, the second (B) polymeric material is polycarbonate, and the third (C) polymeric material is polymethyl methacrylate. For some three component combinations, the B component may not only contribute to the reflective properties of the body but may also act as an adhesive layer to bond the A and C components in the multilayer body.

In other three component combinations, the polymer making up the third component may be placed in the multilayer body as a moisture or oxygen barrier layer, a toughening layer or a rubbery layer to prevent crack propagation. When the third polymer component is a barrier layer, it may be present as a single layer on one or both exterior surfaces of the body or as interior layers. For example, suitable barrier layer materials such as copolymers of ethylene and vinyl alcohol, copolymers of polyvinylidene chloride, nitrile polymers, and nylons may be used in or on the multilayer body. Suitable adhesive materials such as maleic anhydride grafted polyolefins may be used to bond such barrier layer materials to the multilayer body. Alternatively, the barrier layer may comprise a fourth polymer in the repeating pattern.

A third or fourth diverse polymer may be also be used as a surface or skin layer on one or both major exterior surfaces for an ABCB repeating body or as an interior layer The skin layer may be sacrificial, or may be permanent and serve as a scratch resistant or weatherable protective layer. Further, such skin layers may be post applied to the body after coextrusion. For example, a skin layer may be applied as a sprayed on coating which would act to level the surface of the body to improve optical properties and impart scratch resistance, chemical resistance and/or weatherability. The skin layer may also be laminated to the multilayered body. Lamination is desirable for those polymers which are not readily coextrudable.

In one embodiment of the invention, the polymeric body includes three diverse polymer materials with every other layer in the ABCBA repeating unit being an optically thick layer having an optical thickness of not less than 0.45 micrometers with the other layers being optically very thin, and having an optical thickness of not more than 0.09 micrometers. For a polymeric body having ABCB repeating units, either one or two of the three layers may be optically thick, with the other layers preferably being optically very thin layers. In an alternative form, the ABCB repeating units comprise alternating optically thick layers having optical thicknesses of at least 0.45 micrometers.

The reflective polymeric body is preferably in the form of a sheet having two major exterior surfaces. An outer layer may be included as a surface or skin layer on both major exterior surfaces of the reflective body. The skin layer may be sacrificial, or may be permanent and serve as a scratch resistant or weatherable protective layer. Further, such skin layers may be post applied to the body after coextrusion. For example, a skin layer may be applied as a sprayed on coating which acts to level the surface of the body to improve optical properties and impart scratch resistance, chemical resistance and/or weatherability. The skin layer may also be laminated to the multilayered body. Lamination is desirable for those polymers which are not readily coextrudable.

In certain embodiments of the invention, it is desirable to form the reflective polymeric body to comprise at least 500 or more layers. Increasing the total number of layers in the polymeric body has been found to increase its reflectivity (i.e., the percentage of incident light reflected from the body). Thus, by controlling the number of layers, the degree of reflectivity of the article may be controlled.

In some embodiments of the invention it may be desirable to incorporate coloring agents such as dyes or pigments into one or more of the individual layers of the polymeric body. This can be done to one or both of the outer or skin layers of the body, or alternatively, the coloring agent may be incorporated into one or more interior layers in the body. The coloring agents may be selected to give the polymeric body a metallic appearance other than its normal silvery appearance such as bronze, copper, or gold, for example.

Different colors such as black, blue, red, yellow, white, and the like may also be used. Typically, it is most desirable to use pigmented coloring agents in the interior layers to provide opaqueness and a two-sided mirror-like reflective quality and to use dyes on exterior surface layers. Coloring agents may be used in combination to provide desirable coloring and optical properties. For example, a pigmented white coloring agent may be used in an interior surface while a colored dye, such as blue, yellow, red, or green may be included on one or more surface layers to provide a unique reflective colored effect.

Further, while the normal surface of the body is smooth to give a highly reflective silver appearance, in some instances it may be desirable to give the surface of the body a roughened or brushed appearance to simulate a brushed metallic appearance. Further, a solvent may be used to etch the surface of the multilayer body to provide a matte or pewter look to the body. Additionally, the body may be embossed with a variety of patterns to provide desirable optical effects.

In another embodiment of the invention, the reflective body may be fabricated as a mirror-like polymeric article having at least first and second major surfaces, the article comprising a sufficient number of alternating layers of at least three diverse polymeric materials such that at least 30% of the light, and preferably at least 50% or greater of the light incident on the article is reflected and there is essentially no visibly perceived iridescence. Preferably, a substantial majority of the individual layers of the article have an optical thickness of not more than 0.09 micrometers or not less than 0.45 micrometers. The polymeric materials having the highest and lowest refractive indices should differ from each other in refractive index by at least about 0.03.

To provide the mirror-like quality to the article, one of the major surfaces includes a light absorbent layer, such as a layer of a black or other colored pigment. The light absorbent layer may be coextruded or applied as a lacquer or paint. Alternatively, increasing the number of individual layers to above 500 or more results in increased reflectance of incident light from the article resulting in a mirror-like quality in the article.

Further, the reflective polymeric body of the present invention may also be fabricated to appear mirror-like on all major surfaces by coextruding a light absorbing layer in the interior of the article or by increasing the total number of layers in the body to provide a body having a high level of reflectivity. Thus, a mirror-like polymeric article is provided which has at least first and second major surfaces, with the article comprising a sufficient number of alternating layers of at least three diverse polymeric materials such that at least 30% of light, and preferably at least 50% or greater of the light incident on the article is reflected, at least one interior light absorbing layer, and there is essentially no visibly perceived iridescence. Preferably, a substantial majority of the individual layers of the article have an optical thickness of not more than 0.09 micrometers or not less than 0.45 micrometers. The first, second and third polymeric materials differ from each other in refractive index, with the polymers having the highest and lowest refractive indices differing by at least about 0.03.

The reflective polymeric body of the present invention may also be fabricated to act as a birefringent light polarizer which polarizes a broad band of the electromagnetic spectrum. The polarizer comprises at least three diverse polymeric materials, with the polarizer comprising a sufficient number of alternating layers of the polymeric materials such that at least a portion of the light incident on the polarizer in the plane of polarization is reflected in the plane of polarization and there is essentially no visibly perceived iridescence. Preferably, a substantial majority of the individual layers of the polarizer have an optical thickness of not more than 0.09 micrometers or not less than 0.45 micrometers, and with the polymeric materials having the highest and lowest refractive indices differing from each other in refractive index by at least about 0.03 in one plane of the polarizer.

In a preferred embodiment, the difference in refractive index between the polymeric materials is caused by selecting polymers having differing stress optical coefficients and then stretching those materials in a uniaxial direction to orient the polymeric materials.

Additionally, the multilayer reflective polymeric bodies of the present invention may be formed into a number of decorative and/or structural parts. The bodies may be formed by coextrusion techniques initially into sheets which may then be post formed. Such post forming operations may include thermoforming, vacuum forming, or pressure forming. Further, through the use of forming dies, the multilayer reflective body may be initially formed into a variety of useful shapes including profiles, tubes, parisons which can then be formed into blow-molded containers, and the like. In yet another embodiment of the invention, the polymers chosen may be elastomers to provide an elastomeric reflective body.

Accordingly, it is an object of the present invention to provide a reflective polymeric body comprising multiple components of diverse polymers which lacks visibly perceived iridescent color, which can be fabricated into a variety of parts, is post formable, and which has an essentially colorless reflective appearance. These, and other objects and advantages of the invention will become apparent from the following detailed description, the accompanying drawings, and the appended claims.

DETAILED DESCRIPTION OF THE PREFERRED EMBODIMENTS

The present invention provides a highly reflective multicomponent, multilayer polymeric body made up of from a hundred to several thousand layers of multiple types of optical layers (i.e., optically thick, optically thin, and optically very thin). A portion of the layers of the polymeric materials are optically thin and have an optical thickness between 0.09 micrometers and 0.45 micrometers. The remaining layers are optically thick and have an optical thickness of not less than 0.45 micrometers, or are a combination of optically thick and optically very thin and have optical thicknesses of not more than 0.09 micrometers or not less than 0.45 micrometers, respectively, where the optical thickness is defined as the product of the individual layer thickness times the refractive index of the polymeric material which makes up that layer. Thus, the polymeric reflective body comprises a combination of optically thin layers of from 0.09 micrometers to 0.45 micrometers, optically thick layers of 0.45 micrometers or greater, and/or a combination of optically thick and very thin optical layers of 0.45 micrometers or greater and 0.09 micrometers or less.

In one embodiment, the multilayer reflective polymeric body of the present invention is made up of a substantial majority of multiple alternating optically thick or combinations of optically thick and very thin layers, as opposed to the multilayer "thin film" articles of the prior art. For purposes of optical properties, i.e., reflectance and transmittance, an optically thin layer can be described as a layer having an optical thickness in the range of from $\lambda/4$ to $5\lambda/4$, where $\lambda$ represents the visible wavelength range. Thus, for layers to be used in the visible wavelength band, an optically thin layer has been described in the literature as one whose thickness, D, is less than about 0.5 micrometers or whose optical thickness, ND (where N is the refractive index of the material) is less than about 0.7 micrometers. Vasicek, *Optics of Thin Films* (1960) at pages 100 and 139.

Optically thin film layers rely on the constructive optical interference of light to produce intense reflected light in the visible, ultraviolet, or infrared portions of the electromagnetic spectrum according to the equation:

$\lambda_m = (2/m)(N_1D_1 + N_2D_2)$, where $\lambda_m$ is the reflected wavelength in nanometers, $N_1$ and $N_2$ are the refractive indices of the alternating polymers, $D_1$ and $D_2$ are the thickness of the respective layers of polymers in nanometers, and m is the order of reflection (m = 1,2,3,4,5). Each solution of the equation determines a wavelength at which an intense reflection, relative to surrounding regions, is expected. The intensity of the reflection is a function of the "f-ratio" where, $F = N_1D_1/(N_1D_1 + N_2D_2)$ By proper selection of the f-ratio, one can exercise some degree of control over the intensity of reflection of the various higher order reflections. For example, first order visible reflections of violet (0.38 micrometer wavelength) to red (0.68 micrometer wavelength) can be obtained with layer optical thicknesses between about 0.075–0.25 micrometers. Iridescent films may also be designed to reflect visible light at higher order reflectances, although at lower intensities.

As can be seen, such thin film polymeric bodies are strongly dependent upon film (and individual layer) thickness to determine reflected wavelength. Such thin films are extremely sensitive to thickness changes, and it is characteristic of such thin films to exhibit nonuniform streaks and spots of color.

The multicomponent, multilayer bodies of the present invention do not display the vivid iridescence which is displayed in prior art colorful iridescent films. In fact, it is an important object of this invention specifically to avoid layer thicknesses which result in substantial iridescent color. By alternating layers too thick to cause iridescence, or alternating thick layers in combination with layers too thin to cause iridescence, a reflection results which is essentially silver and non-iridescent. This silvery appearance is due to higher order reflections from the thick layers being so closely spaced that the human eye perceives the reflection to be essentially non-iridescent.

We have described how such optically thin layers may be introduced into a multilayer reflective body without introducing visible iridescence effects. See our commonly-assigned U.S. application Ser. No. 629,520, filed Dec. 18, 1990, and entitled "Polymeric Reflective Bodies with Multiple Layer Types," the disclosure of which is hereby incorporated by reference. By the judicious combination of multiple optical layer types, including the position and percentage of optically thin layers, highly reflective bodies may be produced with essentially no visibly perceived iridescence. It is within the scope of the present invention, which includes bodies containing three or more diverse polymers, to arrange the layers in such bodies to include optically thin layers, with the proviso that such layers produce essentially no visibly perceived iridescence.

Articles made in accordance with the present invention exhibit a uniform silvery reflective appearance, not the multicolored, iridescent appearance common to prior art thin film multilayer articles. The reflective characteristics of the multicomponent optically thick or combination of optically thick/very thin layers of the present invention are governed by the following equation:

$$R_k = \frac{(R_{k-1} + r_k - 2R_{k-1}r_k)}{(1 - R_{k-1}r_k)} \times 100$$

where $R_k$ is the amount of reflected light (%) for a stack of k layers having as many as k different refractive indices, $R_{k-1}$ is the amount of reflected light from the k−1 layer, and $$r_k = \left(\frac{N_h - N_l}{N_h + N_l}\right)^2$$

where $r_k$ is the amount of light reflected at the $k^{th}$ layer interface, and where $N_h$ is the refractive index of the polymeric material having the higher refractive index at the $k^{th}$ layer interface and $N_l$ is the refractive index of the polymeric material having the lower refractive index at the $k^{th}$ layer interface. See Vasicek, *Optics of Thin Films* (1960) at pages 69-70 where the author derives the above equation for multiple reflection of light between different refracting surfaces. By viewing reflectance as a loss of light due to reflection, the author provides a generalized procedure for calculating reflectance at k refractive surfaces. This relationship contrasts greatly with that of prior thin film articles whose reflectivity is highly sensitive to layer thickness and angle of view. However, the addition of optically thin layers to the polymeric body can enhance or increase reflectance more than the value predicted by this equation.

The above equation is simplified for a two component system (ABAB) so that:

$$R = (kr)/(1+(k-1)r) \times 100$$

where R is the amount of reflected light (%), k is the number of optically thick and optically very thin layers, and $r = [(N_1 - N_2)/(N_1 + N_2)]^2$. We previously described several two component, as well as multicomponent, reflective polymeric bodies in our previously filed U.S. Pat. Nos. 5,122,905 and 5,122,906, the disclosures of which are hereby incorporated by reference. These equations demonstrate that the reflectance of the polymeric body is dependent on the refractive indices at each layer interface.

Thus, the reflected wavelength of light from the multilayer polymeric body of the present invention is independent of both individual layer and total structure thickness over a wide processing range so long as a sufficient number of the individual layers have an optical thickness of either at least about 0.45 micrometers, or not more than 0.09 micrometers. Uniformity of reflection is inherent in the design of the body. Moreover, a gradient of layer thickness through the thickness of the body is neither detrimental nor advantageous to the appearance of the body as long as a sufficient number of the individual layers of the polymers maintains an optical thickness of at least about 0.45 micrometers or not more than 0.09 micrometers. This again contrasts with prior optically thin film articles which reflect broad or narrow bandwidths depending upon layer thickness gradient.

Thus, it is not necessary for all of the layers in the reflective polymeric bodies of the present invention to have optical thicknesses of at least 0.45 micrometers or not more than 0.09 micrometers. The preferred coextrusion process for fabricating the polymeric bodies of the present invention may introduce layer thickness variations both through the thickness of the body and in the plane of individual layers. Variation in layer thicknesses of each polymeric component can be as much as 300% or more. However, useful reflective bodies and articles may be made even with such wide variations as long as a sufficient number of the layers have an optical thickness of at least 0.45 micrometers or not more than 0.09 micrometers. With this condition met, there is an absence of visibly perceived interference colors reflected from bodies and articles of the present invention.

The absence of the iridescent interference colors which characterize prior art thin films is somewhat subjective to the human eye. However, we have found that when about 75% of the layers in the body have optical thicknesses which are either at least 0.45 micrometers or not more than 0.09 micrometers, a broad band, visually uniform reflectance of substantially all wavelengths (white light) which characterize the present invention is obtained. A minority of about 25% or fewer of the layers having optical thicknesses in the range of 0.1 to 0.45 micrometers have been found to have interference reflections of a sufficiently low intensity so that the body will have essentially no visibly perceived iridescence.

The reflectivity of the polymeric body is also affected by the total number of optically thick or combination of optically thick and very thin layers used. The body becomes more highly reflective of incident light (i.e., transmits less light) as the total number of layers are increased. Preferably, the number of layers is sufficient to produce an article which will reflect at least 30% of the incident light, for those wavelengths for which there is negligible absorption. If it is desired to use the reflective polymeric body of the present invention as a mirror, adding additional layers will increase the reflectance of the body to 50% or higher to produce a silvery, mirror-like appearance.

The reflectivity of the body is also affected by the difference in refractive index among the three polymers used. That is, the greater the difference in refractive index, the greater the reflectivity of the body. Accordingly, it can be seen that the reflective nature of the polymeric bodies may be controlled by the selection of polymers for the optically thick or optically thick and very thin layers having differing refractive indices and by fabricating the body to have additional layers.

The reflective multicomponent, multilayered polymeric bodies of the present invention may comprise alternating layers of a wide variety of generally transparent thermoplastic materials. Suitable thermoplastic resins, along with representative refractive indices, which may be used in the practice of the present invention include, but are not limited to: copolycarbonates of bisphenol and thiodiphenol (refractive index=1.59 to 1.64), blends of polymethyl methacrylate and vinylidene fluoride (1.42 to 1.49), bisphenol A polycarbonate (1.59), copolymers of methyl methacrylate and vinylidene fluoride, polymethyl acrylate (1.48), polymethyl methacrylate (1.49), blends and copolymers of polymethyl methacrylate and polyvinylidene fluoride; copolymers of vinylidene fluoride and other halogenated monomers such as chlorofluoroethylene, chlorodifluoroethylene, chlorotrifluoroethylene, chlorotrifluoroethylene, hexafluoroacetone, hexafluoropropylene, hexafluoropropene, pentafluoropropylene, trifluoroethylene, tetrafluoroethylene, and vinyl fluoride blended with polymethyl methacrylate; blends of polyvinylidene fluoride and poly(vinyl acetate); copolymers of methyl methacrylate, vinylidene fluoride, and a monomer selected from the group consisting of chlorofluoroethylene, chlorodifluoroethylene, chlorotrifluoroethylene, chlorotrifluoroethylene, hexafluoroacetone, hexafluoropropylene, hexafluoropropene, pentafluoropropylene, trifluoroethylene, tetrafluoroethylene, and vinyl fluoride blended with polymethyl methacrylate; and blends of polyvinylidene fluoride and poly(vinyl acetate).

The refractive indices reported above may vary somewhat at different wavelengths. For example, the refractive index of polycarbonate is somewhat greater for light in the blue region of the spectrum and somewhat lower for light in the red region of the spectrum.

Copolymers of the above resins are also useful such as ethylene and vinyl alcohol, styrene and hydroxy ethylacrylate, styrene and maleic anhydride, styrene-butadiene block copolymers, styrene and methyl methacrylate, and styrene and acrylic acid. Elastomeric resins such as those described in Schrenk et. al., U.S. Pat. No. 4,937,134, the disclosure of which is incorporated herein by reference, may also be used to produce an elastomeric reflective body. Other useful polymeric materials include polyetheretherketones, polybutene, maleic anhydride grafted polyolefins such as Admer (available from Mitsui Chemicals) and Plexar (available from Quantum Chemicals), and copolymers of ethylene and vinyl acetate such as CXA (available from du Pont). The latter three polymers are particularly useful as adhesive layers to bond other polymeric layers together in the multilayer construction.

A condition for the selection of the polymers to make up the layers of the body is that the polymers are selected so that the polymer components having the highest and lowest refractive indices differ from each other by at least about 0.03. Other polymer components may have refractive indices intermediate those of the polymers having the highest and lowest refractive indices. Further, the polymers should preferably be compatible in processing temperatures so that they may be readily coextruded.

Figure 1:
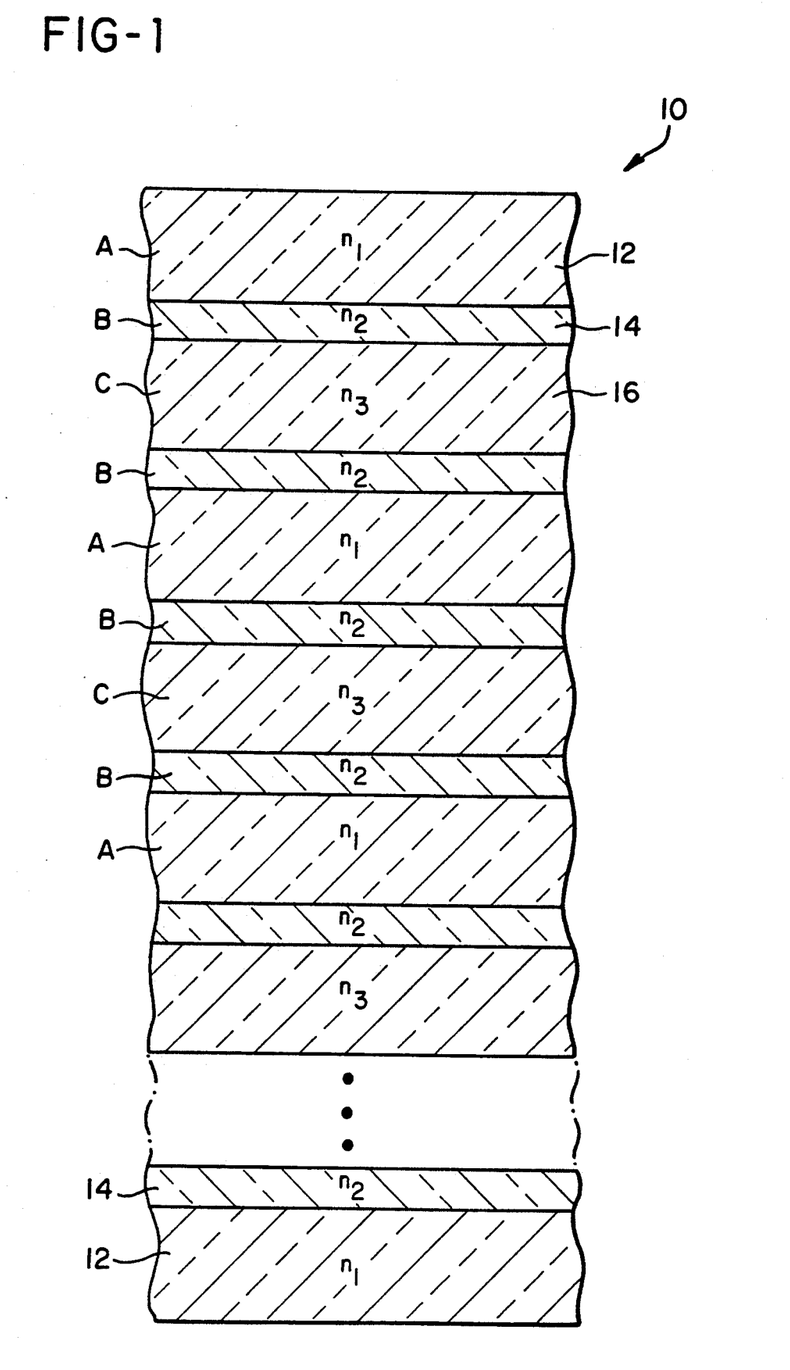
FIG. 1 is a schematic cross-section of a three component multilayer polymeric reflective body of the present invention, where the first polymer, A, has a refractive index, $n_1$, the second polymer, B, has a refractive index, $n_2$, and the third polymer, C, has a refractive index, $n_3$.
Figure 2A:
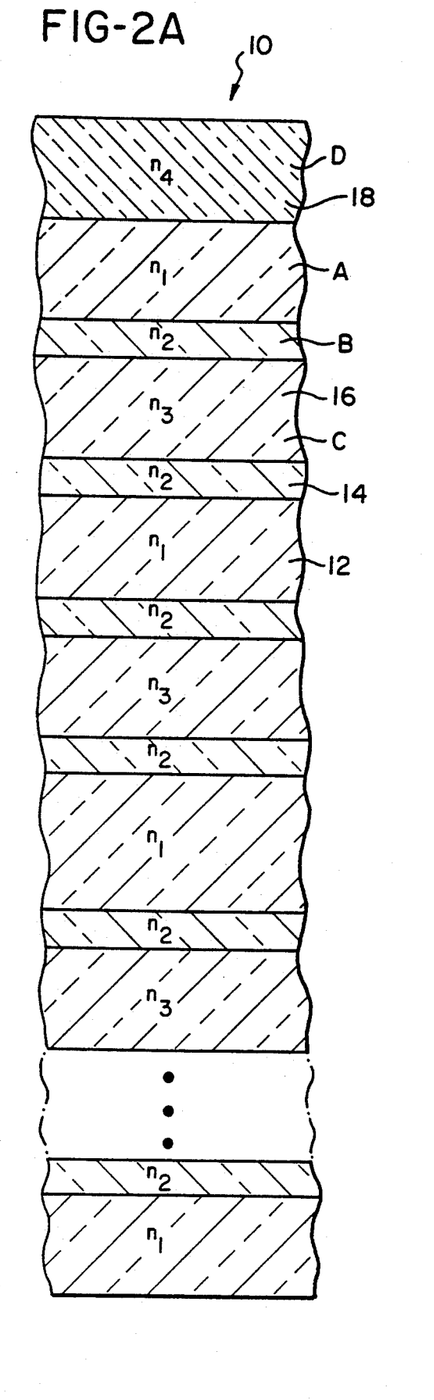
FIG. 2A is a schematic cross section of a three component multilayer polymeric reflective body and includes a barrier layer polymer, D, having a refractive index, $n_4$, on one exterior surface thereof.
Figure 2B:
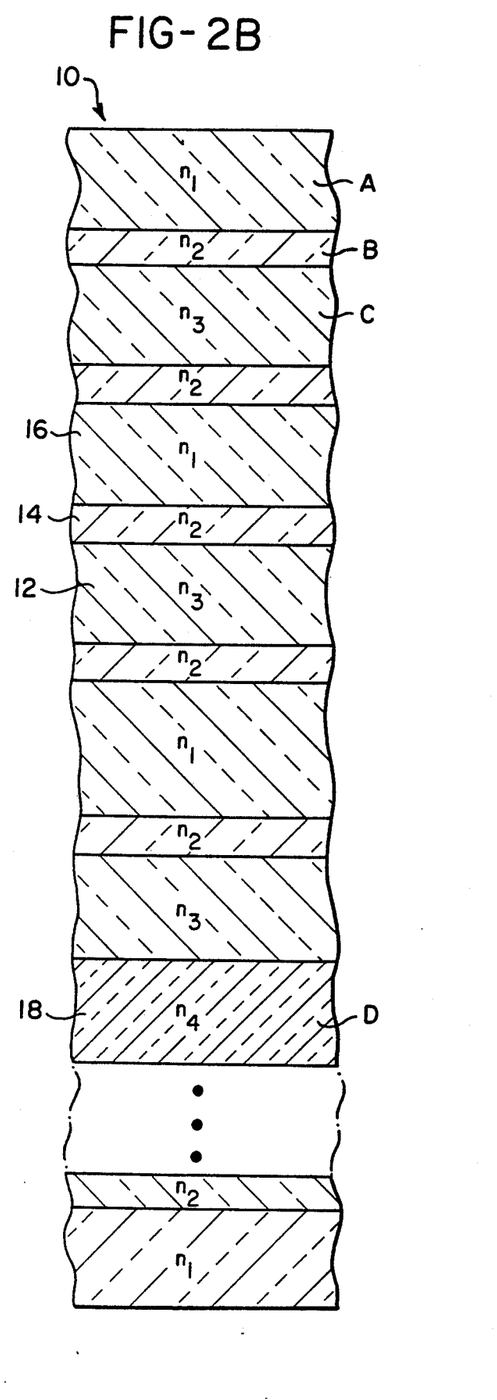
FIG. 2B is also a schematic cross-section of a three component multilayer reflective body and includes a barrier layer polymer, D, having a refractive index, $n_4$, as an interior layer.

An example of a three component multilayer reflective polymer body in the form of a sheet 10 is shown schematically in FIG. 1. The body 10 includes alternating layers of a first polymer (A) 12 having a refractive index, $n_1$, a second polymer (B) 14 having a refractive index, $n_2$, and a third polymer (C) 16 having a refractive index, $n_3$. FIG. 1 shows one preferred form of the invention where all of the layers of the first and third polymers A and C have an optical thickness of at least 0.45 micrometers and all of the layers of the second polymer B have an optical thickness of not more than 0.09 micrometers. FIGS. 2A and 2B show the presence of a fourth polymer (D) 18 having a refractive index, $n_4$. In this instance, the polymer acts as a barrier layer, such as a layer which is impermeable to or only selectively permeable to gases or moisture. In FIG. 2A, the barrier layer is on an exterior surface of the reflective body. In FIG. 2B, the barrier layer is one of the interior layers of the reflective body.

Figure 3:
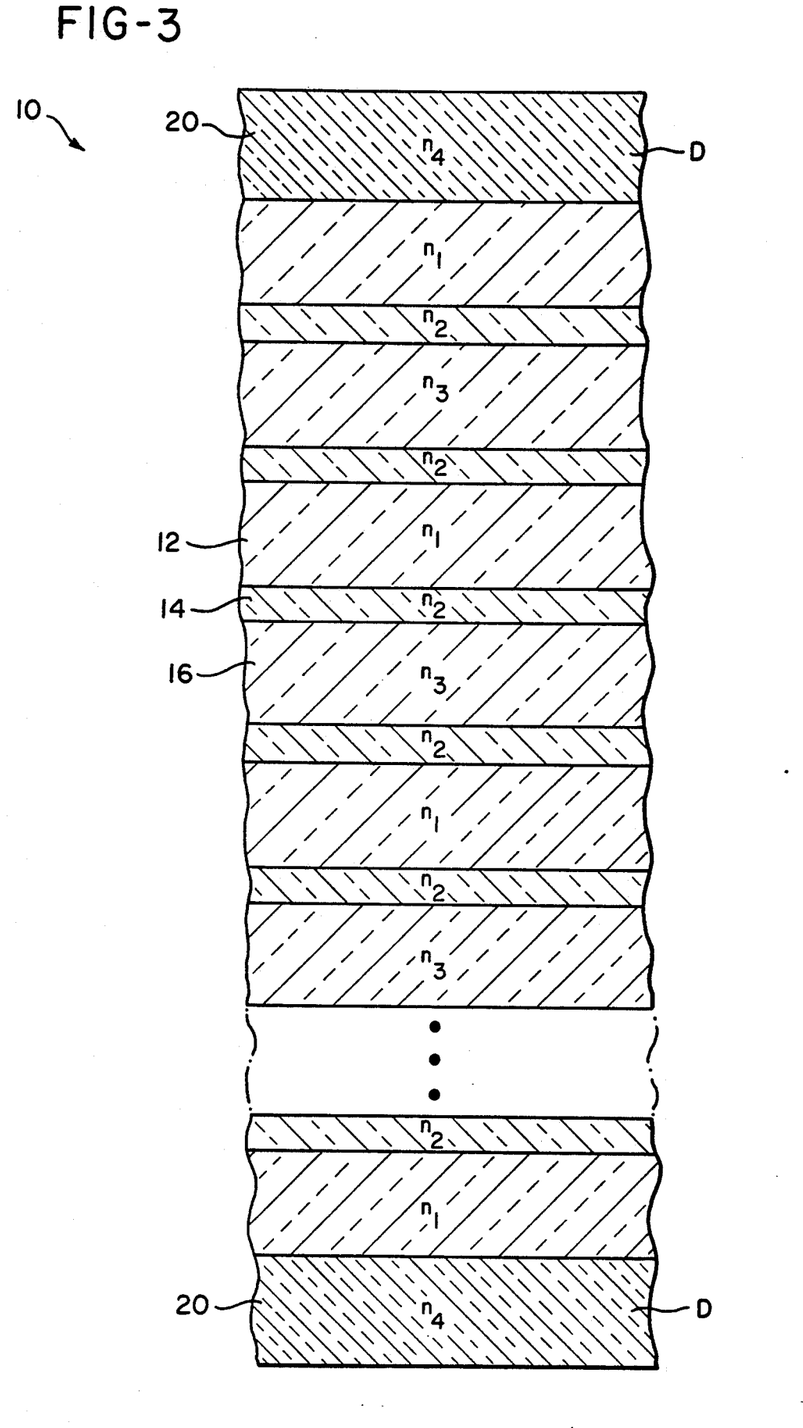
FIG. 3 is a schematic cross-section of a three component multilayer polymeric reflective body having protective skin layers of a polymer, D, having a refractive index, $n_4$, on both exterior surfaces thereof.

FIG. 3 illustrates yet another embodiment of the invention in which one or more protective skin layers are present on the reflective body. As shown in FIG. 3, skin layers of a polymer (D) 20 are positioned on both major exterior surfaces of the reflective body to protect the other layers from scratches or weathering.

Multilayer bodies in accordance with the present invention are most advantageously prepared by employing a multilayered coextrusion device as described in U.S. Pat. Nos. 3,773,882 and 3,884,606, the disclosures of which are incorporated herein by reference. Such a device provides a method for preparing multilayered, simultaneously extruded thermoplastic materials. Preferably, a series of layer multiplying means as are described in U.S. Pat. No. 3,759,647, the disclosure of which is incorporated herein by reference, may be employed.

The feedblock of the coextrusion device receives streams of the diverse thermoplastic polymeric materials from a source such as a heat plastifying extruder. The streams of resinous materials are passed to a mechanical manipulating section within the feedblock. This section serves to rearrange the original streams into a multilayered stream having the number of layers desired in the final body. Optionally, this multilayered stream may be subsequently passed through a series of layer multiplying means in order to further increase the number of layers in the final body.

The multilayered stream is then passed into an extrusion die which is so constructed and arranged that streamlined flow is maintained therein. Such an extrusion device is described in U.S. Pat. No. 3,557,265, the disclosure of which is incorporated by reference herein. The resultant product is extruded to form a multilayered body in which each layer is generally parallel to the major surface of adjacent layers.

The configuration of the extrusion die can vary and can be such as to reduce the thickness and dimensions of each of the layers. The precise degree of reduction in thickness of the layers delivered from the mechanical orienting section, the configuration of the die, and the amount of mechanical working of the body after extrusion are all factors which affect the thickness of the individual layers in the final body. It is necessary, however, that the optical thickness of a sufficient number of the layers of polymeric material be either at least 0.45 micrometers or not more than 0.09 micrometers so that there is an absence of visibly perceived color.

Reflective polymeric bodies produced by the practice of the present invention may have a wide variety of potentially useful applications. For example, the bodies may be post formed into concave, convex, parabolic, half-silvered, etc. mirrors. If suitably flexible or rubbery polymers (elastomers) are utilized, the bodies may be bent or recoverably stretched into varying shapes. The mirror-like appearance may be accomplished by coextruding a black or otherwise light absorbing layer on one side of the body. Alternatively, one side of the final body may be coated with a colored paint or pigment to provide a highly reflective mirror-like body. Such mirrors would not be subject to breakage as would glass mirrors.

In some embodiments of the invention it may be desirable to incorporate coloring agents such as dyes or pigments into one or more of the individual layers of the polymeric body. This can be done to one or both of the outer or skin layers of the body, or alternatively, the coloring agent may be incorporated into one or more interior layers in the body. The coloring agents may be selected to give the polymeric body a metallic appearance other than its normal silvery appearance such as bronze, copper, or gold, for example.

Different colors such as black, blue, red, yellow, white, and the like may also be used. Typically, it is most desirable to use pigmented coloring agents in the interior layers to provide opaqueness and a mirror-like reflective quality and to use dyes on exterior surface layers. Coloring agents may be used in combination to provide desirable coloring and optical properties. For example, a pigmented white coloring agent may be used in an interior surface while a colored dye, such as blue, yellow, red, or green may be included on one or more surface layers to provide a unique reflective colored effect.

Further, while the normal surface of the body is smooth to give a highly reflective silver appearance, in some instances it may be desirable to give the surface of the body a roughened or brushed appearance to simulate a brushed metallic appearance. Further, a solvent may be used to etch the surface of the multilayer body to provide a matte or pewter look to the body. Additionally, the body may be embossed with a variety of patterns to provide desirable optical effects.

The reflective polymeric bodies may also be used as birefringent polarizers as described in commonly-assigned U.S. application Ser. No. 618,191 filed Nov. 26, 1990, and entitled "Coextruded Birefringent Interference Polarizer", the disclosure of which is hereby incorporated by reference. Through proper selection of the polymeric materials making up the layers, a refractive index mismatch in one plane of the polarizer may be achieved. In a preferred method, the refractive index mismatch may be created after fabrication of the reflective polymeric body. For a three component system, for example, having a repeating unit of ABCB, the polymeric materials may be selected so that the first material has a positive stress optical coefficient, the second polymeric material has a negative stress optical coefficient, and the third polymeric material has a zero stress optical coefficient. Stretching the body such that the first two polymeric materials are stretched in a uniaxial direction causes them to orient and results in a refractive index mismatch in the plane of orientation to produce the polarizer. A broad band width of visible light passing through such bodies is polarized. This is in distinction to prior thin film multilayer polarizers which polarized only specific narrow wavelength ranges of light.

Additionally, the highly reflective polymeric bodies may be fabricated as non-corroding metallic appearing articles for indoor or outdoor exposure. For example, the polymeric bodies may be fabricated into signs, or bright work for appliances. The bodies may be post formed into highly reflective parts such as automotive head lamp reflectors, bezels, hub caps, radio knobs, automotive trim, or the like, by processes such as thermoforming, vacuum forming, shaping, rolling, or pressure forming. The bodies may also be formed into silvery or metallic appearing bathroom or kitchen fixtures which do not corrode or flake.

Figure 4:
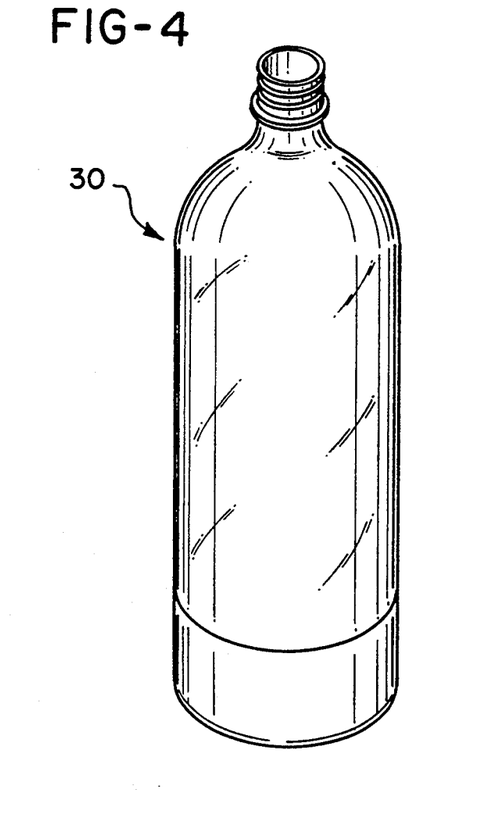
FIG. 4 is a perspective view of a blow-molded container made from the multilayer reflective body of the present invention.

A number of different profiles may be coextruded in addition to sheets and films of the reflective polymeric materials. By profiles, we mean shaping of the multilayer body (1) in a forming die into sheets, channels, lenticular cross-sections, round or elliptical tubes, and parisons, or (2) outside of a die by a post forming procedure. For example, decorative moldings such as wall moldings and picture frame moldings, automotive trim, home siding, and the like may be readily coextruded through forming dies. Use of a tubular extrusion die produces a multilayered metallic appearing pipe. Such tubular dies may also be used to produce parisons which may then be blow molded into silvery appearing bottles and containers such as blow-molded container 30 as shown in FIG. 4. Because the materials used in the construction of the body may be selected for given desired properties, elastomers may be used and the final body may be flexible or rubbery, producing an article which could be used as a variable focal length reflector by flexing the article to different degrees.

The reflective polymeric bodies of the present invention may also be post formed into a wide variety of items such as two-way mirrors, infrared reflectors for insulation, and solar intensifiers to concentrate solar radiation. Other articles may find use in commercial and industrial lighting applications. The bodies may also be formed into dinnerware, tableware, containers, and packages. By the proper selection of the polymers which are used, such articles may be made to be microwavable.

In order that the invention may be more readily understood, reference is made to the following examples, which are intended to be illustrative of the invention, but are not intended to be limiting in scope.

EXAMPLE 1

Employing an apparatus as generally described in U.S. Pat. Nos. 3,773,883 and 3,884,606, incorporated herein by reference, a three component reflective polymeric body having an ABCBA repeating layer pattern was produced using: as the "A" layer, Dow Styron 685D polystyrene (refractive index=1.586); as the "B" layer, Richardson RPC-440 styrenemethylmethacrylate copolymer (refractive index=1.53); and as the "C" layer, Cryo Acrylite H15-003 polymethyl methacrylate (refractive index=1.49). The reflective body had 1313 layers or approximately equal average thickness (i.e., each of the layers A:B:C:B made up 25% of the core). Mass flow rates of the three extruders was 9.3 lb/hr. for the polystyrene (PS); 21.0 lb/hr. for the styrene-methylmethacrylate copolymer (SMMA) and 11.7 lb/hr. for the polymethyl methacrylate (PMMA). The body included a skin layer of polystyrene (Dow Styron 685D) extruded at a mass flow rate of approximately 12.0 lb/hr. A reflective sheet was produced in which a substantial majority of the layers had an optical thickness of at least 0.45 micrometers. No iridescent color was observed. The sheet had an average reflectance of 41%.

EXAMPLE 2

A three component reflective body was produced as in Example 1 using: as the "A" layer, thiodiphenol copolycarbonate (TDP, refractive index=1.636); as the "B" layer, polycarbonate (CALIBRE ®302-22, trademark of the Dow Chemical Company; refractive index = 1.586); and as the "C" layer, polymethyl methacrylate (Cryo Acrylite H15003; refractive index = 1.49). The three materials were coextruded into 1313 layers and capped on both surfaces of the sheet with polycarbonate skin. Extruder rates of 32.3 lb/hr. for the TDP, 30.2 lb/hr. for the polycarbonate, and 30.0 lb/hr. for the PMMA were used. The skin layer of polycarbonate was extruded at a total rate for both sides of 11.9 lb/hr. The film sample obtained had an average reflectance of 74%.

EXAMPLE 3

A three component reflective body was produced as in Example 1 except that the layer thickness ratio was 33:16.7:33:16.7 (A:B:C:B % of the total core layers). Extruder rates of 16.7 lb/hr for the PS, 15.0 lb/hr for the SMMA, and 16.0 lb/hr for the PMMA were used. A reflective sheet was produced in which a substantial majority of the layers had an optical thickness of at least 0.45 micrometers. No iridescent color was observed.

EXAMPLE 4

A three component reflective body was produced as in Example 1 except that the layer thickness ratio was 41.0:8.6:41.8:8.6 (A:B:C:B % of the total core layers). Extruder rates of 25.6 lb/hr for the PS, 22.0 lb/hr for the SMMA, and 30.0 lb/hr for the PMMA were used. A reflective sheet was produced in which a substantial majority of the layers had an optical thickness of at least 0.45 micrometers. No iridescent color was observed.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A reflective polymer body of at least first, second, and third diverse polymeric materials, the body comprising a sufficient number of alternating layers of said polymeric material such that a portion of the light incident on said body is reflected but such that essentially no visibly perceived iridescence is reflected, a sufficient number of the individual layers of said body (1) having an optical thickness of not more than 0.09 micrometers or not less than 0.45 micrometers, with at least one of said individual layers having an optical thickness of not more than 0.09 micrometers, or (2) having an optical thickness of not less than 045 micrometers, and wherein said polymeric materials having the highest and lowest refractive indices differ from each other by at least about 0.03.

2. The reflective polymeric body of claim 1 wherein said first polymeric material comprises polystyrene, said second polymeric material comprises a copolymer of styrene and methacrylic acid, and said third polymeric material comprises polymethyl methacrylate.

3. The reflective polymeric body of claim 1 in which said body comprises at least 500 layers.

4. The reflective polymeric body of claim 1 in which said polymeric body is thermoformable.

5. The reflective polymeric body of claim 1 including a coloring agent incorporated into at least one layer of said polymeric body.

6. The reflective polymeric body of claim 5 in which said coloring agent is selected from the group consisting of pigments and dyes.

7. The reflective polymeric body of claim 6 wherein said coloring agent is incorporated into at least one surface layer of said polymeric body.

8. The reflective polymeric body of claim 6 wherein said coloring agent is incorporated into at least one interior layer of said polymeric body.

9. The reflective polymeric body of claim 1 in which at least one surface layer has a brushed or roughened surface.

10. The reflective polymeric body of claim 1 in which at least one surface layer has been etched to provide a matte or pewter finish.

11. The reflective polymeric body of claim 1 in which at least one surface layer has been embossed.

12. The reflective polymeric body of claim 1 in which said body is extruded as a profile.

13. The reflective body of claim 1 in which said body is post formed into a profile.

14. The reflective polymeric body of claim 12 in which said body is in the form of a tube.

15. The reflective body of claim 1 in which said body is a blow-molded container.

16. The reflective polymeric body of claim 1 in which said first, second, and third polymeric materials are elastomers.

17. The reflective polymeric body of claim 1 in which said polymeric body is in the form of a sheet having two major surfaces.

18. The reflective polymeric body of claim 1 which includes a gas or moisture barrier layer as an exterior layer of said body.

19. The reflective polymeric body of claim 17 in which said body includes a permanent protective skin layer on at least one major surface thereof.

20. The reflective body of claim 1 in which said polymeric body includes first, second, and third diverse polymeric materials of alternating layers in a pattern ABCB.

21. The reflective polymeric body of claim 20 in which said first polymeric material is thiodiphenyl copolycarbonate, said second polymeric material is polycarbonate, and said third polymeric material is polymethyl methacrylate.

22. A mirror like polymeric article having at least first and second major surfaces, said article comprising a sufficient number of alternating layers of at least first, second, and third polymeric materials such that at least 30% of light incident on said article is reflected, but such that essentially no visibly perceived iridescence is reflected, a sufficient number of the individual layers of said mirror like article (1) having an optical thickness of not more than 0.09 micrometers or not less than 0.45 micrometers, with at least one of said individual layers having an optical thickness of not more than 0.09 micrometers, or (2) having an optical thickness of not less than 0.45 micrometers, and wherein said polymeric materials having the highest and lowest refractive indices differ from each other by at least about 0.03, and wherein a light absorbent layer in included as one of said major surfaces or as an interior layer.

23. A birefringent light polarizer which reflects light anisotropically, comprising multiple layers of at least first, second, and third diverse polymeric materials, a sufficient number of the individual layers of said polarizer having (1) an optical thickness of not more than 0.09 micrometers or not less than 0.45 micrometers, with at least one of said individual layers having an optical thickness of not more than 0.09 micrometers, or (2) having an optical thickness of not less than 0.45 micrometers, and wherein at least two of said polymeric materials differ from each other in refractive index by at least about 0.03 in one plane of the polarizer.

24. The birefringent light polarizer of claim 23 in which the difference in refractive index between said polymeric materials is caused by stretching said polymeric materials in a uniaxial direction to orient said polymeric materials.

* * * * *